Feb. 6, 1945.    C. R. PYLES ET AL    2,368,779
FLASHLIGHT PROJECTOR
Filed May 13, 1943    2 Sheets-Sheet 2
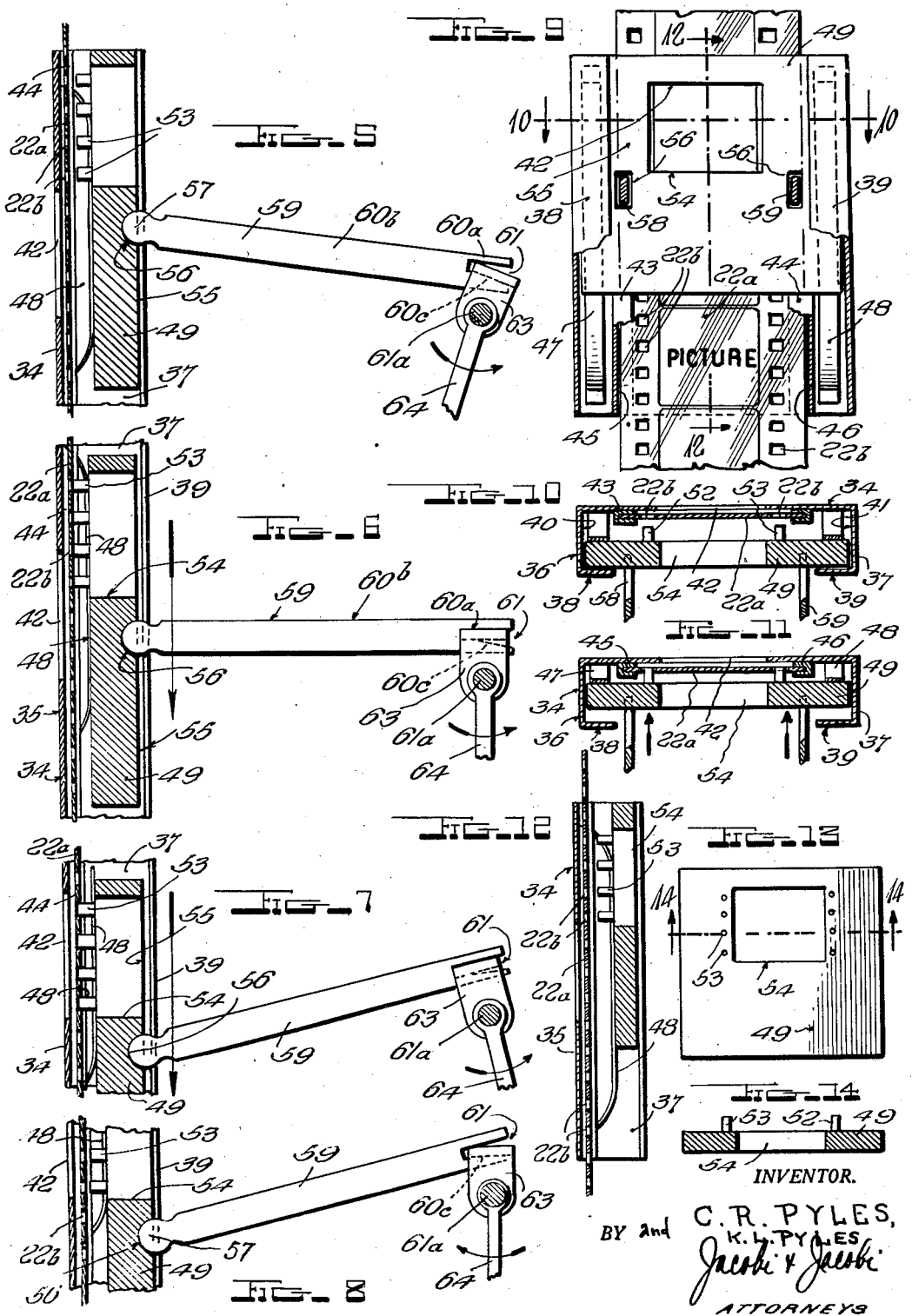
INVENTOR.
C. R. PYLES,
K. L. PYLES
BY and
Jacobi & Jacobi
ATTORNEYS Patented Feb. 6, 1945

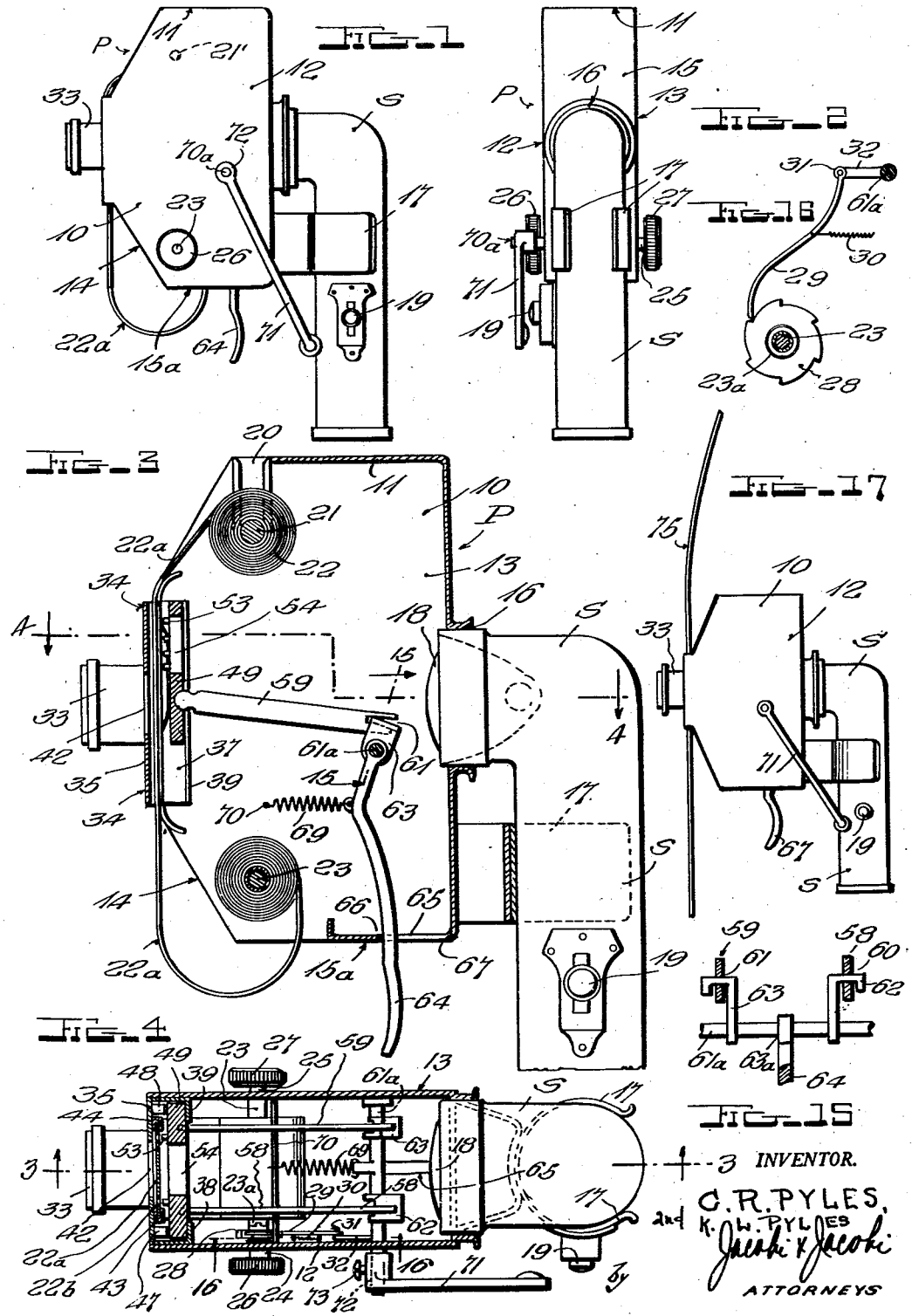

2,368,779

UNITED STATES PATENT OFFICE 2,368,779

FLASHLIGHT PROJECTOR

Clarence R. Pyles and Katie Louise Pyles, Harrisburg, Pa.

Application May 13, 1943, Serial No. 486,878

6 Claims. (Cl. 88—28)

The instant invention relates to a projector and more particularly to a portable projector which finds its greatest utility as an aid to a lecturer or instructor in projecting plans, pictures, and the like on a screen for preferably a relatively short period of time or for a longer period, at the option of the operator.

One of the primary objects of the invention is the construction of a projecting mechanism of the type indicated in which the light source is a flashlight readily attached to the projector proper, and in which the flashlight may function as a handle in the use of the device.

Yet another aim is the provision in a device of the type specified of a simple, yet efficient, intermittent film-feeding mechanism operable by a manually actuatable trigger, the latter having means associated therewith for intermittently operating a flashlight switch.

The above and other aims and objects will be apparent from the detailed description hereinafter appearing when taken in conjunction with the appended drawings showing a preferred embodiment of the invention and in which Fig. 1 is a side-elevational view of the projector showing the parts in position for use;

Fig. 2 is an end or rear view of the projector shown in Fig. 1;

Fig. 3 is a central, vertical, longitudinal, sectional view on a slightly large scale taken on line 3—3 of Fig. 4;

Fig. 4 is a horizontal sectional view taken on line 4—4 of Fig. 3;

Figs. 5, 6, 7 and 8 are fragmentary views, partly in section, illustrating a number of the progressive positions of the film-feeding means actuatable by the manually operable trigger;

Fig. 9 is an elevational view with parts broken away of the film-framing means and its associated film-feeding slide;

Fig. 10 is a horizontal sectional view taken on line 10—10 of Fig. 9;

Fig. 11 is a view similar to Fig. 10, but showing the tooth-carrying slide in engagement with the marginal perforations in the film;

Fig. 12 is a vertical sectional view taken on line 12—12 of Fig. 9;

Fig. 13 is a front elevational view of the tooth-carrying slide member;

Fig. 14 is a sectional view taken on line 14—14 of Fig. 13;

Fig. 15 is a sectional view of a portion of the trigger mechanism taken on line 15—15 of Fig. 3;

Fig. 16 is a sectional view of a spring-controlled pawl associated with a film-spool and taken on line 16—16 of Fig. 4; and Fig. 17 is a view similar to Fig. 1 showing a modified manner of exhibiting a strip of film.

Referring now to the drawings, the reference character P designates the projector as a unit which includes a hollow casing 10 having a top wall 11, side walls 12 and 13, an open front wall 14, a rear wall 15, and a bottom wall 15ª. The rear wall is centrally apertured as at 16 and mounts a pair of spring clamps 17 adjacent the lower outer surface thereof for detachably supporting a flashlight S, the lens 18 of which is operatively held by said clamps within the aperture 16 of the casing 10. The flashlight is equipped with a conventional spring-pressed switch member 19 for illuminating the flashlight bulb when said member is actuated in the manner to be hereinafter described.

The inner surfaces of side walls 12 and 13 of the casing 10 are provided with U-shape guides 20 for rotatably supporting the shaft 21 of a supply roll 22 of film 22ª which may be a 35 mm. film, what is known as a three-quarter by one inch film, or any other chosen size. The unwound and projected film 22ª is adapted to be wound on a transverse, rotatable take-up shaft 23 journalled in side walls 12 and 13 adjacent lower portion of casing 10. Shaft 23 is equipped with a spring-pressed, split clutch 23ª and has its opposite ends 24 and 25 extending through said side walls, each end being equipped with a manually operable knurled knob 26 and 27, respectively, for rolling up and exerting tension on film 22ª. Fastened to the shaft 23 is a ratchet 28 having a pawl 29, tensioned by a spring 30, said pawl being mounted as at 31 on a supporting arm 32 secured to the side wall 12 of casing 10—see Fig. 16. From the above description it will now be understood that as the film 22ª is unwound from its supply reel 22, the unwound or projected portion is received on the take-up reel or shaft 23 by manual actuation or rotation of the latter by means of the knobs 26 and 27 with tension of said film controlled by the spring-pressed, split clutch 23ª.

Front wall 14 of casing 10 is equipped with an appropriately mounted, conventional telescopic lens 33 in alignment with the aperture 16 in the rear wall of the casing 10 and, therefore, in alignment with the source of light from the flashlight. Fixedly supported on said front wall is a picture-framing member 34 characterized by a front wall 35, narrow side walls 36 and 37, each of the latter being inturned as at 38 and 39 to form a pair of guides or channels 40 and 41—see Figs. 9 to 12 inclusive. The front wall 35 of framing member 34 has a rectangular opening 42 aligned with lens 33 and aperture 16, said opening being preferably of a size to properly frame one scene, diagram, or picture on filmstrip 22ª. A pair of spaced channel members 43 and 44 are secured to the inner surface of wall 35, the distance between the channels 45 and 46 in said members being substantially equal to the width of film 22ª and the depth of each of the channels 45 and 46 being such as to constitute a frictional fit for the film as the latter is guided therethrough, whereby said film will be held in any adjusted position. A pair of spaced longitudinally extending bow springs, 47 and 48, substantially coextensive in length with frame 43, are fastened at one end thereof to the inner surface of wall 35, spring 47 being positioned in guide 40 intermediate side wall 33 and channel member 43 and spring 48 intermediate side wall 37 and channel member 44.

By reference to Fig. 13, it will be noted that there is disclosed a substantially rectangular plate-like slide member 49 having spaced teeth 52 and 53 on the front face thereof adjacent a rectangular opening 54 of a size and shape identical with that in framing member 34. The bow springs 47 and 48 normally exert pressure against and maintain slide member 49 in proximate position to inturned walls 38 and 39 of the frame member. The teeth 52 and 53 are adapted to engage the marginal perforations 22ᵇ of film 22ª to intermittently move said film a single frame at a time in a manner now to be described.

Rear face 55 of slide member 49 has spaced sockets 56 to receive the ball-shaped ends 57 of a pair of slide-actuating floating levers 58 and 59, the opposite end of each of which is forked as at 60 and 61. It will be noted that each of the forked ends 60 and 61 is characterized by a surface 60ª parallel with upper face 60ᵇ of each floating lever, and a cooperating inclined face 60ᶜ angularly disposed to both surface 60ª and upper surface 60ᵇ. Secured to a shaft 61ª journalled in side walls 12 and 13 of casing 10 adjacent the rear thereof are a pair of spaced clips 62 and 63, each clip being of substantially inverted L-shape configuration. Clip 62 loosely extends into the forked end 60 of lever 58 and clip 63 into the forked end of lever 59—see Fig. 15. A vertically deposed trigger 64 is centrally secured to shaft 61ª as at 63ª, said trigger projecting through a slot 65 in the bottom wall 15ª of casing 10, the opposite ends 66 and 67 of the slot constituting limiting stops for the trigger. A spring 69 has one end thereof secured to trigger 64 and its opposite end fixed to a stationary transverse rod or the like within casing 10. By reference to Fig. 4 it will be seen that one end 70ª of shaft 61ª projects beyond side wall 12 of casing 10. A flashlight switch-actuating lever 71 has a socket 72 at one of its extremities, receiving end 70 of shaft 61ª and being fixed to the latter by a set screw 73. By reference to Figs. 3 to 8 inclusive it will now be seen that manual actuation of trigger 64 by moving same rearwardly against tension of spring 69 or to the right as viewed in Fig. 3, will result in imparting two movements to slide plate or member 49. The first movement forces the slide to the left—Fig. 6—against the tension of bow springs 47 and 48 to cause the engagement of slide teeth 52 and 53 with the marginal perforations 22ᵇ of the film 22ª. Further pressure on the trigger results in a downward motion, as indicated by the arrows in Figs. 6 and 7, being transmitted to the slide 49 and the resultant movement of film 22ª a distance of one picture or frame, this distance being determined by the length of slot 65 in bottom wall 15ª of casing 10. Actuation of trigger 64 produces rotation of shaft 61ª and consequence partial rotation of lever 71, causing contact by the latter with spring-pressed switch member 19 and consequent illumination of the flashlight and projection of a scene onto a screen or the like, the flashlight serving as a handle for holding the projector. The release of trigger 64 results in its returning to the position shown in Fig. 3, the removal of pressure on spring switch member 19 and the extinguishing of the light. It will now be obvious that the speed of operation of the trigger member controls the length of time a picture is projected on the screen.

In Fig. 17 in lieu of film 22ª in reel form there is shown a film strip 75 which may depict a portion of a film continuity or a comic series or similar subject matter.

From the above, it will now be evident that the portable projector or stereopticon may be used in a classroom, lecture room, and the like to project on a screen diagrams or similar matter. It finds ready application in the training of the eyes of aviators in quickly spotting and recognizing planes flashed on the screen for a brief period of time. It will also be deemed obvious that various changes may be made in the specific details shown as will be apparent to those skilled in the art. It is contemplated to cover all such and to be limited in this respect only as may be necessary by the scope of the claims hereto appended.

Having now described the invention, what is claimed and desired to secure by Letters Patent is:

1. A projector comprising a casing having a front wall and an apertured rear wall, a projector lens supported on said front wall, a flashlight detachably mounted externally of said casing with its lensed end extending through the aperture in said rear wall in alignment with said lens, said flashlight being spaced from the rear wall and constituting a handle for the casing, a film supply carried by said casing, means for intermittently moving said film across the inner end of said lens, said means including a trigger mechanism within the casing, said mechanism having an operating member extending through the bottom of the casing in front of a portion of the flashlight, and means secured to the trigger mechanism for operating the switch of the flashlight in synchronism with movement of the film.

2. In a projector, an intermittent film-feed mechanism comprising a film guide having vertical tracks along opposite sides thereof, spring means within said guide, a film-actuating slide slidably mounted in said tracks and contacting said spring means and urged rearwardly transversely of the guide out of position to grip a film, and means for moving said slide forwardly in the tracks against action of said spring means to a film gripping position and then downwardly with respect to said guide to shift the film downwardly through the guide.

3. In a projector, an intermittent film-feed mechanism comprising a film guiding means, a film-actuating slide within said guiding means, spring means urging said slide rearwardly out of a film engaging position spaced levers each having a front end thereof pivoted to the rear face of said slide, the rear end of each of said levers being forked, and a spring-held trigger mechanism including a rocker shaft, spaced clips fixed to said shaft and having portions loosely fitting in the forked ends of said levers, and a trigger fixed to said shaft for rocking the shaft and swinging the clips to move the slide forwardly into engagement with a film and then downwardly with respect to said guiding means to import movement to the film.

4. A projector comprising a vertically disposed casing having a rear wall formed with an opening spaced upwardly from its bottom, a projector lens carried by the front wall of the casing and disposed opposite the opening in the rear wall thereof, a clamping member carried by the rear wall and projecting horizontally therefrom below the opening in the rear wall, a flashlight detachably gripped by said clamping member and disposed vertically with its lens-carrying upper end portion extending forwardly and passing through the opening in the rear wall and its lower portion projecting downwardly below the casing and constituting a handle, a film supply mounted in said casing, and means for feeding the film across the projector lens including a vertically disposed actuating member extending downwardly through the lower end of the casing and disposed in front of the flashlight in forwardly spaced relation thereto in position to be engaged and actuated by a finger of a hand grasping the handle forming portion of the flashlight.

5. A projector comprising a casing, a projector lens at the front of the casing, an opening being formed through the back of the casing in cooperating relation to the projector lens, a flashlight mounted externally of said casing in position for directing light through the projector lens and constituting a handle for the casing, and means for feeding film across the projector lens having included an actuating member disposed in position to be operated by a hand grasping the flashlight.

6. A projector comprising a casing having a front wall and an apertured rear wall, a projector lens supported on the front wall, a source of light consisting of a flashlight detachably mounted back of said casing and disposed vertically with its lower portion projecting downwardly below the casing to form a handle and its upper portion extending forwardly into the aperture of the rear wall and provided with a lens in alignment with the projector lens of the front wall, a film supply carried by said casing, and means in said casing for intermittently moving film across space between the projector lens and the source of light, said means including actuating mechanism having an operating trigger extending through the bottom of the casing in forwardly spaced relation to the handle forming portion of the flashlight.

CLARENCE R. PYLES.
KATIE LOUISE PYLES.